(12) United States Patent
Corpuz

(10) Patent No.: US 11,979,088 B2
(45) Date of Patent: May 7, 2024

(54) START-UP VOLTAGE OVERSHOOT REDUCTION

(71) Applicant: Advanced Energy Industries, Inc., Denver, CO (US)

(72) Inventor: Mark Corpuz, Cork (IE)

(73) Assignee: Advanced Energy Industries, Inc., Denver, CO (US)

(*) Notice: Subject to any disclaimer, the term of this patent is extended or adjusted under 35 U.S.C. 154(b) by 149 days.

(21) Appl. No.: 17/456,283

(22) Filed: Nov. 23, 2021

(65) Prior Publication Data

US 2022/0190718 A1    Jun. 16, 2022

Related U.S. Application Data (60) Provisional application No. 63/124,191, filed on Dec. 11, 2020.

(51) Int. Cl.
   *H02M 3/157* (2006.01)
   *H02M 1/00* (2006.01)
   *H02M 1/08* (2006.01)

(52) U.S. Cl.
   CPC ........ *H02M 3/157* (2013.01); *H02M 1/0025* (2021.05); *H02M 1/08* (2013.01)

(58) Field of Classification Search
   CPC ....... H02M 3/157; H02M 1/0025; H02M 1/08
   See application file for complete search history.

(56) References Cited

U.S. PATENT DOCUMENTS

| | | | |
|---|---|---|---|
| 6,016,257 A | 1/2000 | Chang et al. | |
| 2010/0148737 A1* | 6/2010 | Li | H02M 3/1588 323/282 |
| 2014/0002043 A1* | 1/2014 | Li | H02M 3/156 323/282 |
| 2015/0123638 A1 | 5/2015 | Thiele et al. | |

FOREIGN PATENT DOCUMENTS

| | | |
|---|---|---|
| DE | 4305573 A1 | 8/1994 |
| IT | BN20120003 A1 | 1/2014 |
| KR | 20160067446 A | 6/2016 |

OTHER PUBLICATIONS

International Search Report and Written Opinion for PCT Application PCT/US2021/061546, dated Mar. 24, 2022; 11 pages.

* cited by examiner

*Primary Examiner* — Kyle J Moody (57) ABSTRACT

A power conversion system comprises a power converter configured to convert an input voltage to an output voltage. The power converter comprises an inductor, at least one power switch coupled to the inductor, a feedback circuit, and a controller. The power converter is configured to generate a sensed output voltage based on the output voltage, provide a feedback signal based on a relationship of the sensed output voltage with a reference voltage, and adjust the reference voltage from a first value to a second value after the sensed output voltage has exceeded the first value. The controller is coupled to the at least one power switch and to the feedback circuit and configured to control the at least one power switch to generate the output voltage based on the feedback signal.

20 Claims, 6 Drawing Sheets

START-UP VOLTAGE OVERSHOOT REDUCTION

CROSS-REFERENCE TO RELATED APPLICATIONS

This application claims benefit of and priority to U.S. Application No. 63/124,191 filed Dec. 11, 2020. The entire disclosure of the above application is incorporated herein by reference.

TECHNICAL FIELD

The present disclosed embodiments relate generally to power supplies, and more specifically to control of power supplies.

BACKGROUND

LLC resonant converters are widely used in a variety of applications including audio, medical, industrial, communications, and military applications. The LLC resonant topology has gained a reputation for unparalleled efficiency compared with conventional PWM converters. Its unique characteristic of zero voltage switching not only reduces the switching losses of power the MOSFETs but provides smooth voltage and current commutation that results in very low EMI noise generation. As a result, it provides an avenue for an efficient, power dense, fan-less supply of power with relatively low noise generation.

Figure 9:
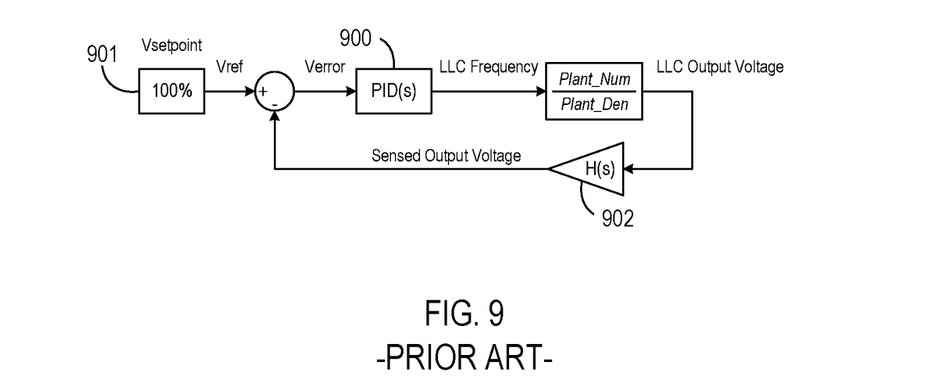
FIG. 9 illustrates a known control diagram of an LLC resonant converter subject to undesirable start-up voltage overshoot.
Figure 10:
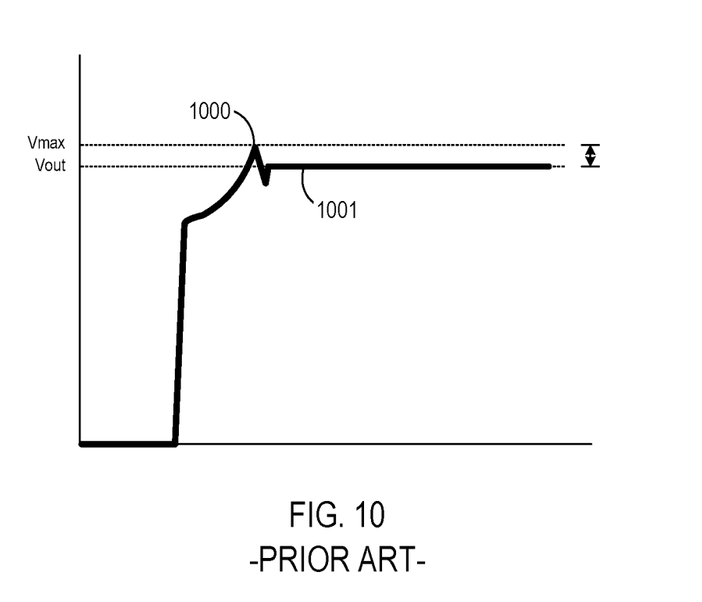
FIG. 10 illustrates a plot of voltage overshoot exceeding output voltage via implementation of the control system of FIG. 9.

A disadvantage of such converters includes an undesirable inrush of current during start-up. Another disadvantage of the LLC topology, especially in a wide trim output voltage-based application, is start-up voltage overshoot and non-monotonic response. FIG. 9 illustrates a known control diagram of an LLC resonant converter subject to undesirable start-up voltage overshoot. A proportional-integral-derivative (PID) control 900 receives a voltage error signal including a reference voltage generated by a voltage setpoint 901 that is modified by a sensed output voltage (H(s)) 902 to provide feedback to the PID control 900 for setting the frequency control of the LLC converter to generate the desired output voltage. During a start-up portion of the LLC converter, the output voltage begins at zero volts and ramps up to the target output voltage based on the voltage setpoint 901. Until the sensed output voltage 902 has reached the target output voltage, the voltage error signal is solely based on the voltage setpoint 901. It is not until after the target output voltage has surpassed that the voltage error signal begins to be modified based on the sensed output voltage 902. The PID control 900 may, for example, change the frequency control to anticipate lowering too much output voltage to the target value. However, such frequency control change is reactionary to the sensed output voltage 902 already having reached the target output voltage. As a result, output voltage overshoot 1000 above the target output voltage 1001 occurs as illustrated in FIG. 10. Such overshoot can exceed maximum design requirements. In addition, the modification of the frequency control to lower the output voltage is not instantaneous, and various cycles may pass before the output voltage is lowered to the target value. Accordingly, the output voltage overshoot may be undesirable both in magnitude and in time. The voltage overshoot above the target output voltage can lead to a failure to meet maximum output voltage requirements.

For a non-trimmable output, the overshoot may be minimized by optimization. However, optimization of the controller can be difficult when a trimmable output voltage is used. Capacitive loading requirements and N+1 configurations (e.g., redundancy) can also exacerbate the issue. Attempting to optimize for every scenario requires dedicated control techniques for each mode resulting in code complexity.

Overview

In accordance with one aspect of the present disclosure, a power conversion system comprises a power converter configured to convert an input voltage to an output voltage. The power converter comprises an inductor, at least one power switch coupled to the inductor, a feedback circuit, and a controller. The power converter is configured to generate a sensed output voltage based on the output voltage, provide a feedback signal based on a relationship of the sensed output voltage with a reference voltage, and adjust the reference voltage from a first value to a second value after the sensed output voltage has exceeded the first value. The controller is coupled to the at least one power switch and to the feedback circuit and configured to control the at least one power switch to generate the output voltage based on the feedback signal.

In accordance with another aspect of the present disclosure, a method of controlling output voltage overshoot in a power converter is provided. The power converter includes an inductor, at least one power switch coupled to the inductor, a feedback circuit, and a controller coupled to the feedback circuit. The method comprises controlling the power converter to produce an output voltage based on a feedback signal, generating a sensed output voltage based on the output voltage of the power converter, providing the feedback signal from the feedback circuit to the controller based on a comparison of the sensed output voltage with a reference voltage, and adjusting the reference voltage from a start-up voltage to a runtime voltage in response to a comparison of the sensed output voltage with a threshold voltage.

BRIEF DESCRIPTION OF THE DRAWINGS

The drawings illustrate embodiments presently contemplated for carrying out the invention.

In the drawings.

While the present disclosure is susceptible to various modifications and alternative forms, specific embodiments thereof have been shown by way of example in the drawings and are herein described in detail. It should be understood, however, that the description herein of specific embodiments is not intended to limit the present disclosure to the particular forms disclosed, but on the contrary, the intention is to cover all modifications, equivalents, and alternatives falling within the spirit and scope of the present disclosure. Note that corresponding reference numerals indicate corresponding parts throughout the several views of the drawings.

DETAILED DESCRIPTION

Examples of the present disclosure will now be described more fully with reference to the accompanying drawings. The following description is merely exemplary in nature and is not intended to limit the present disclosure, application, or uses.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
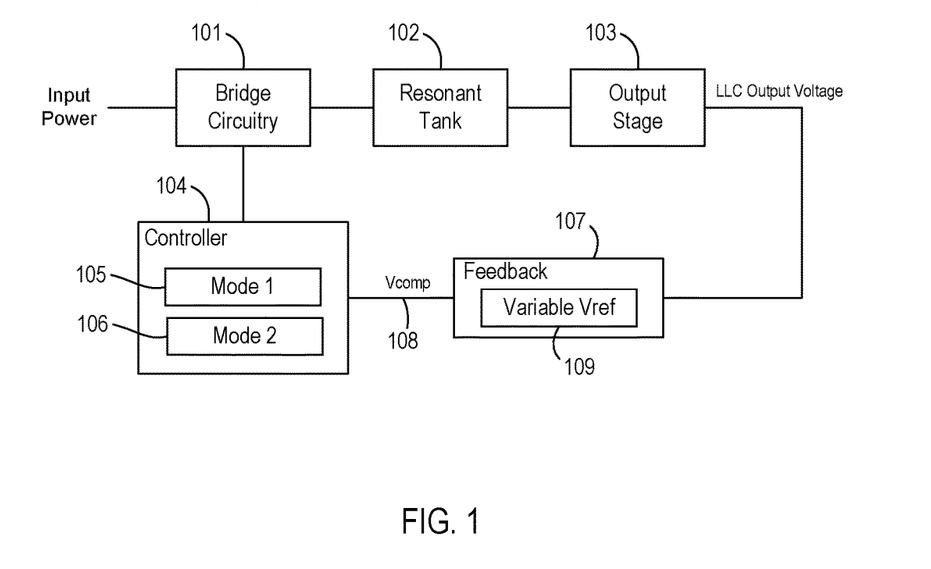
FIG. 1 is a control diagram depicting an exemplary LLC-based power converter incorporating a two-part control methodology according to an example.
Figure 2:
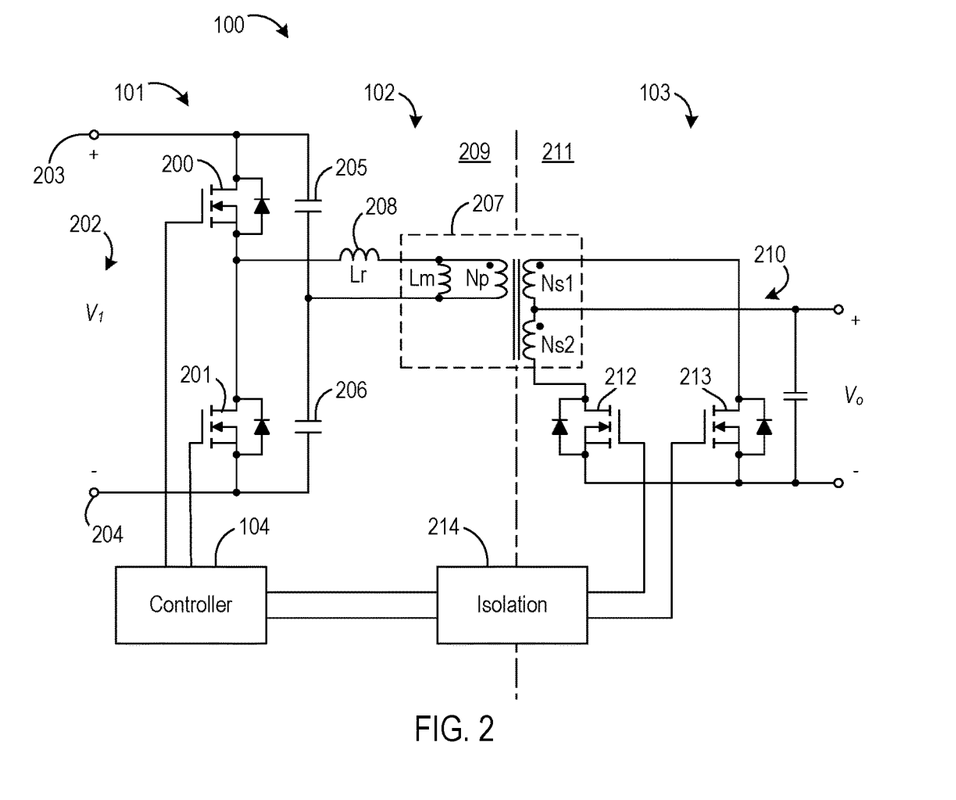
FIG. 2 illustrates a circuit diagram for the LLC converter of FIG. 1 according to an example.

Referring first to FIG. 1, a block diagram is shown depicting an exemplary LLC-based power converter 100 that may utilize aspects of the two-part control methodology disclosed herein. As shown, the LLC converter 100 may include bridge circuitry 101, a resonant tank 102, and an output stage 103. The bridge circuitry 101 may include a half-bridge circuit (as illustrated in FIG. 2) that operates according to well-known principles to receive DC power and apply a square wave to the resonant tank 102. In response, the resonant tank 102 applies a sinusoidal waveform to the output stage 103, which may optionally include one or more transformers and corresponding rectifiers to isolate the output from the resonant tank 102 and provide one or more DC outputs. For example, the output stage 103 may provide two or more variant outputs, which may or may not be implemented as trimmable outputs.

As shown, the controller 104 includes multi-mode control that includes a first control mode 105 and a second control mode 106. A feedback circuit 107 coupled to the output stage 103 provides a compensator voltage signal 108 to the controller 104 that indicates the relationship of the output voltage of the LLC converter 100 to a voltage reference signal 109. The voltage reference signal 109 is variable for controlling voltage overshoot as described herein.

During start-up of the LLC converter 100, the controller 104 operates in the first control mode 105 (e.g., open-loop control), and the voltage reference signal 109 is set to a first, start-up value. During the first control mode 105, the controller 104 may control the output voltage rise with a digital open-loop control technique that linearly sweeps the frequency at a fixed rate. For example, the controller 104 may control the switching frequency of the resonant tank 102 starting with a first frequency and lowering the frequency while the compensator voltage signal 108 indicates that the output voltage remains below the target operating voltage. In response to compensator voltage signal signal 108 indicating that the voltage reference signal 109 has been met or exceeded, the controller 104 transitions to closed-loop control for the second control mode 106. After the controller 104 has transitioned to the closed-loop control, the voltage reference signal 109 is modified to a second, runtime value.

FIG. 2 illustrates a circuit diagram for the LLC converter 100 of FIG. 1 according to an example. As shown, the LLC converter 100 is a resonant half-bridge LLC series converter. However, other resonant converters are contemplated such as a full-bridge LLC series converter, half- or full-bridge LCC converters, LC converters, and the like. The LLC converter 100 includes two power switches 200-201 coupled to a voltage input 202 having a pair of input terminals 203-204 configured to receive a DC voltage such as a DC voltage present on a power factor correction (PFC) output bus (not shown). Two capacitors 205-206, a primary winding Np of a transformer 207, a resonant inductor 208 are coupled to a primary side 209 of the LLC converter 100. A rectifying circuit 210 and secondary windings Ns1, Ns2 of the transformer 207 are coupled to a secondary side 211 of the LLC converter 100. The capacitors 205-206, the primary winding Np of the inductor 208, and a magnetizing inductance (e.g., Lm) of the transformer 207 form the resonant LLC tank. The rectifying circuit 210 is shown as a full-wave rectifier including a pair of synchronous rectifier switches 212-213 coupled to a center-tapped secondary winding (e.g., Ns1, Ns2) of the transformer 207. In other configurations, the rectifying circuit 210 may include diodes in place of the synchronous rectifier switches 212-213.

As illustrated in FIG. 2, the controller 104 is coupled to control the power switches 200-201 on the primary side 209 of the LLC converter 100 using frequency modulation (FM) signals in one implementation. The controller 104 (or another controller) is also configured to drive the power switches 200-201 through an isolation component 214 using PWM signals. In one example, the isolation component 214 may be an optocoupler, a transformer, or other isolation device.

Figure 3:
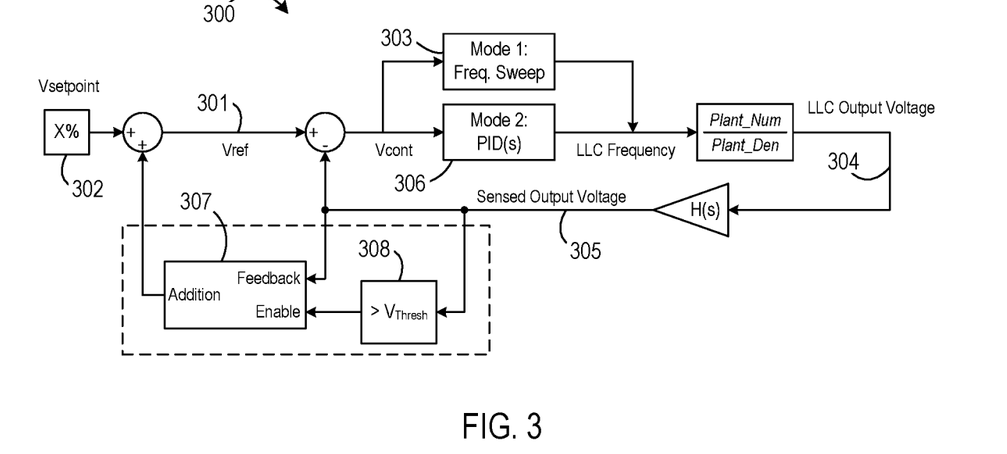
FIG. 3 illustrates a control diagram depicting a two-part overshoot reduction control method according to an example.

Referring next to FIG. 3, a diagram is shown of a control system 300 depicting aspects of a two-part control method for controlling the LLC converter 100 of FIG. 1 according to an example. While referring to FIG. 3, simultaneous reference is made to FIG. 4, which is a flowchart depicting a method 400 that may be traversed in connection with the implementations depicted in FIG. 3 (and FIG. 5 discussed below).

As shown, a reference voltage 301 is set (step 401) based on a setpoint voltage, $V_{setpoint}$ 302, during a start-up of the LLC converter 100. During the start-up, the controller 104 operates in the first control mode 303 (e.g., first control mode 105 of FIG. 1), which includes open-loop control as described above. During the first control mode 303, the output voltage 304 generated by the LLC converter is adjusted (step 402) based on the first control mode 105 of FIG. 1. As one of ordinary skill in the art will appreciate, in the context of the LLC converter 100, the output voltage 304 is adjusted by adjusting the LLC frequency, and as described above, the first control mode 105 may be implemented by a digital open-loop control approach that linearly sweeps the frequency at a fixed rate. The output voltage 304 increases via the open-loop control from a voltage value of zero at the beginning of the first control mode 105 toward an output voltage 304 based on the reference voltage 301.

The output voltage 304 is monitored (step 403) through a conversion of the output voltage 304 to a sensed output voltage 305. The converted output voltage 305 is compared (step 404) with the reference voltage 301 to determine if the sensed output voltage 305 is below or above the reference voltage 301. While the sensed output voltage 305 remains below the reference voltage 301 (step 405), the controller 104 continues to drive the frequency (step 402) to increase the output voltage 304. Since the sensed output voltage 305 correspondingly increases as the output voltage 304 increases, the sensed output voltage 305 increases toward the reference voltage 301. In response to the sensed output voltage 305 meeting or exceeding the voltage threshold 308 (step 406), the controller 104 transitions to operation of the LLC converter 100 in the second control mode 306 (e.g., second control mode 106 of FIG. 1), which adjusts (step 407) the output voltage 304 using closed-loop control based on PID or other feedback control.

The voltage reference signal 109 used during start-up may be set to X % of the runtime voltage reference value (100%) to be used during the second control mode 106, where X % is less than the runtime voltage reference value by Y %. In general, X % is greater than 50%, and Y % is less than 50%. In many implementations, X % is greater than 60%, and Y % is less than 40%, and in some implementations, X % is greater than 70%, and Y % is less than 30%. As a particular example, the output voltage rise may be controlled with X % equal to 90% and Y % equal to 10%. Based on the above, the start-up voltage reference signal 109 is set to a value (e.g., X %) calculated to cause the controller 104 to transition from the first control mode 105, 303 to the second control mode 106, 306 at an output voltage value below the target output voltage desired for steady-state operation. For example, for a target output voltage of 28V and a sensed output voltage conversion configured to convert the 28V to 1.25V for comparison with the runtime voltage reference value, the start-up voltage reference signal 109 may be set to a value of 1.125V (e.g., 90% of 1.25V) such that an output voltage of 25.2V (e.g., 90% of 28V) causes the controller 104 to transition from the first control mode 105, 303 to the second control mode 106, 306. Since the control mode transition to the second control mode 106, 306 is reactionary and happens after the output voltage has reached at least the output voltage of 25.2V, some overshoot of the output voltage occurs while the controller 104 operates to maintain the output voltage at 25.2V. However, since the target runtime output voltage of the LLC converter 100 is 28V in this example, a magnitude of the output voltage overshoot above 111% of the 25.2V would need to occur to surpass the target runtime output voltage. Should the maximum output voltage level parameter in this example be set to 2% or more above the target runtime output voltage, the magnitude of the output voltage overshoot in response to the transition has even more room to ensure that the maximum output voltage level parameter is not violated. Accordingly, any output voltage overshoot may be maintained below the maximum output voltage level parameter and even below the target runtime output voltage in some implementations.

Setting the start-up voltage reference signal 109 to X % of the runtime voltage reference value determined to yield the target output voltage does not allow the controller 104 to control the LLC converter 100 to produce the target output voltage, however. Instead, as presented in the example above, the start-up voltage reference signal 109 to X % causes the controller 104 to control the LLC converter 100 to produce X % of the target output voltage. Accordingly, an adjustment (step 408) is performed to raise the reference voltage 301 to the value (e.g., 1.25V in the example above) determined to yield the target output voltage. In addition to comparing the sensed output voltage 305 with the reference voltage 301 for determining when to transition from the first control mode 105, 303 to the second control mode 106, 306, the control system 300 includes controlling enablement of an additional voltage 307 to be added to the $V_{setpoint}$ 302. The enablement may be based on the sensed output voltage 305 as shown. While the sensed output voltage 305 remains below a voltage threshold, $V_{Thresh}$, 308, the additional voltage 307 is disabled. However, in response to the sensed output voltage 305 meeting or exceeding the voltage threshold, $V_{Thresh}$, 308, the additional voltage 307 is enabled to adjust (step 408) the reference voltage to the second, higher value. In the example illustrated in FIG. 3, the $V_{setpoint}$ 302 remains set to its initial value and the difference (e.g., Y %) is added to the $V_{setpoint}$ 302 via the additional voltage 307. Thus, based on the example above, an additional voltage 307 of 0.125V may be added to the 1.125V of the $V_{setpoint}$ 302 to yield the target voltage reference value determined to yield the target output voltage 304 of 28V.

In response to the adjusted reference voltage 301, the controller 104 operates to control the LLC converter 100 to produce a higher output voltage 304 than the output voltage 304 based on the unadjusted, start-up voltage reference signal 109. The controller 104 may operate to adjust (step 409) the output voltage the LLC converter 100 toward the target output voltage in a steady-state mode.

Figure 5:
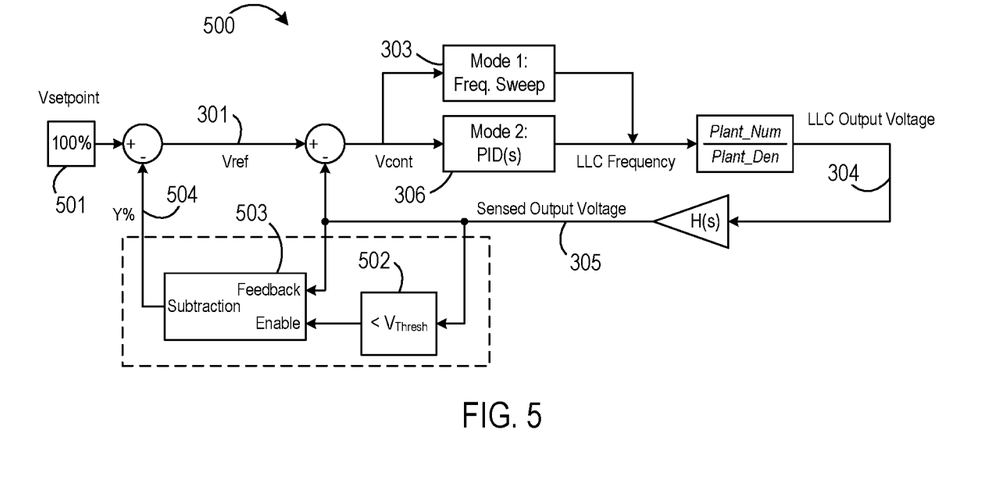
FIG. 5 illustrates a control diagram depicting a two-part overshoot reduction control method according to another example.

FIG. 5 illustrates a diagram of a control system 500 depicting aspects of the two-part control method according to another example. Controls in common with control system 300 are described above. The control system 300 of FIG. 3 has been described as having the $V_{setpoint}$ 302 set to a fixed value less than the value necessary to yield a target output voltage such that the lower reference voltage 301 is used during the first control mode 105 while an additional voltage 307 is added to the lower $V_{setpoint}$ 302 to adjust the reference voltage 301 to the target reference voltage during the second control mode 106.

Figure 4:
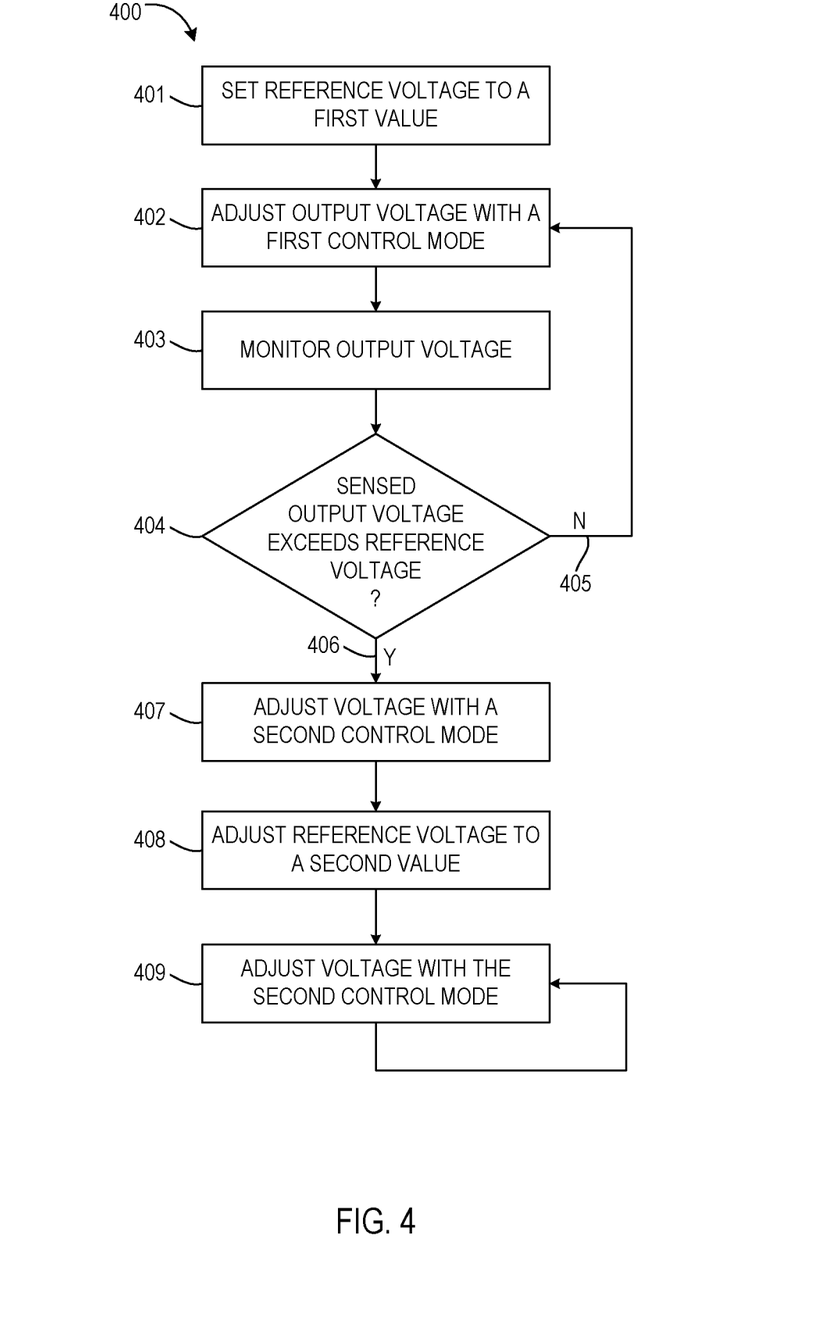
FIG. 4 illustrates a flowchart of an overshoot reduction method according to an example.

The control system 500 operates to produce similar or identical results of the output voltage 304 as the control system 300 of FIG. 3, but rather than providing a lower $V_{setpoint}$ 302 value as in the control system 300, the control system 500 sets the $V_{setpoint}$ 501 to the full value (e.g., 100%) of the reference voltage 301 determined to yield the target output voltage 304 during runtime at steady-state. During control of the LLC converter 100 through the first control mode 105, 303, the sensed output voltage 305 is less than the voltage threshold 502, thus enabling the subtraction control 503 to reduce the $V_{setpoint}$ 501 by a subtraction voltage 504 equal to Y %. Thus, subtracting the subtraction voltage from the $V_{setpoint}$ 501 yields a reference voltage 301 of X % (e.g., 100%−Y %) during the first control mode 105, 303. In response to the sensed output voltage 305 being greater than the voltage threshold 502, the subtraction control 503 is disabled, returning the reference voltage 301 to the $V_{setpoint}$ 501 (e.g., 100%) configured to produce the target output voltage 304 during steady-state operation. With reference to FIGS. 4 and 5, setting the reference voltage to a first value at step 401 includes subtracting the subtraction voltage 504 from the $V_{setpoint}$ 501 to set the reference voltage 301. Further, adjusting the reference voltage to the second value at step 408 includes disabling the subtraction control 503 to stop subtracting the subtraction voltage 504 from the $V_{setpoint}$ 501.

Figure 6:
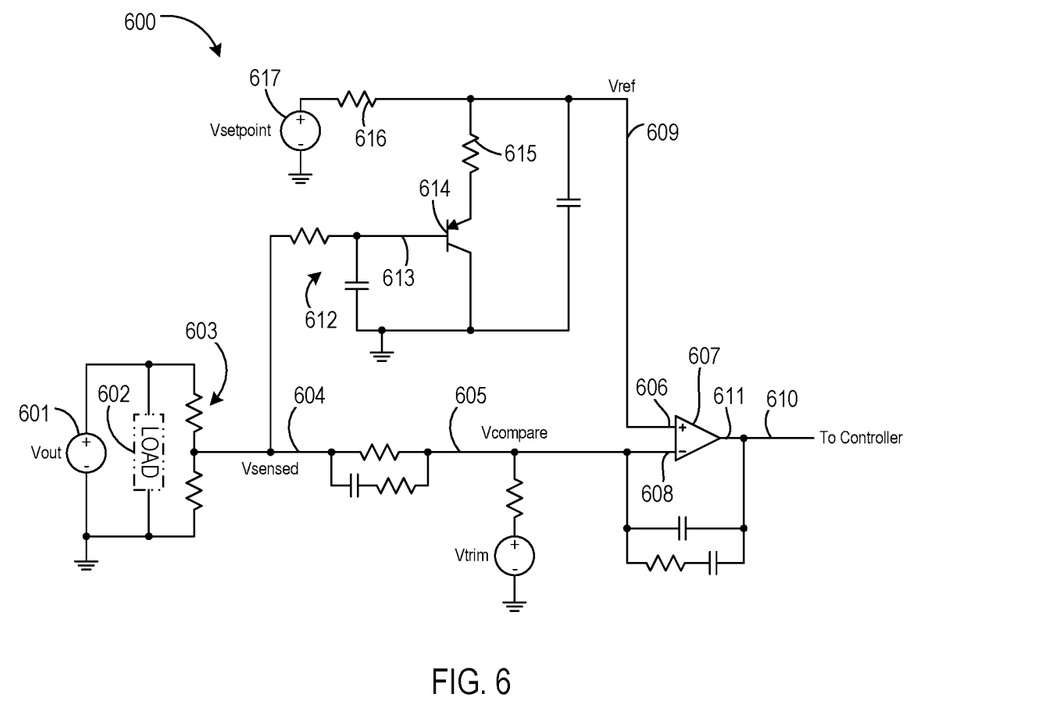
FIG. 6 illustrates a schematic of a circuit that may be utilized to set the threshold, $V_{Thresh}$, and trigger the closed loop mode

FIG. 6 depicts a schematic of a feedback circuit 600 that may be utilized to implement the control system 500 of FIG. 5 according to an example. The output voltage (e.g., output voltage 304) is represented as a voltage source Vout 601, and an optional load 602 (illustrated in phantom) may be coupled thereto. A voltage divider 603 illustrated as a pair of serially-connected resistors is configured to convert a portion of the output voltage to a lower voltage (e.g., sensed output voltage $V_{sense}$a 604) for providing feedback to the controller 104 (FIG. 1) to determine when to switch from the first control mode 105 to the second control mode 106 in an example. While the voltage divider 603 is shown as two resistors, other types of voltage converters are contemplated herein for generating the sensed output voltage 604 based on the $V_{out}$ 601 such as an impedance network having more than two resistors, a variable resistor, etc. A comparison voltage (e.g., $V_{compare}$ 605) based on the sensed output voltage 604 is provided to the inverting input 608 of a comparator 607. The non-inverting input 606 of the comparator 607 is coupled to receive a reference voltage (e.g., $V_{ref}$ 609), and the comparator 607 provides a comparison signal 610 from an operational amplifier (op-amp) output 611 to the controller 104 that indicates the relationship of the comparison voltage 605 to the reference voltage 609.

A resistor-capacitor ("RC") sub-circuit 612 connected to the sensed output voltage 604 provides a conduction mode control signal 613 to a subtraction switch 614, illustrated as a PNP transistor. It is contemplated that the switch 614 may be another type of switch such as a MOSFET, relay, or other controllable switch. When controlled into its conduction mode, the switch 614 allows current from the reference voltage 609 to pass through a resistor 615, thus creating a voltage divider with a resistor 616 coupled with a voltage setpoint source (e.g., $V_{setpoint}$ 617). The resistance values of the resistors 615, 616 may be determined based on the percentage (e.g., X % as discussed herein) of the voltage setpoint value 617 to be used during the first control mode 105. For example, the resistance value of the resistor 615 may be set to a value of X % of the sum of the resistances of both resistors 615, 616. Accordingly, the voltage generated across the resistor 615 will result in a voltage value of X % of the value of the $V_{setpoint}$ 617. When controlled into its non-conduction mode, the switch 614 prevents current flow through the resistor 615 from the reference voltage 609. As a result, the voltage provided to the reference voltage node 609 will be provided solely by the voltage setpoint source 617, and the reference voltage provided to the comparator 607 will be substantially equal to the $V_{setpoint}$ value.

During the start-up portion of the control system 500 after control of the LLC converter 100 to produce the output voltage 304 has begun, the conduction mode control signal 613 rises from a value of zero volts (which turns the switch 614 on) to a turn-off value set by the RC sub-circuit 612. Once reached, the turn-off value causes the switch 614 to turn off. In an example, the turn-off value is equal or substantially equal to the $V_{Thresh}$ value (e.g., voltage threshold 502). Accordingly, while the conduction mode control signal 613 remains below the turn-off value, control of the LLC converter 100 by the controller 104 is by the first control mode 105. Furthermore, the subtraction voltage (e.g., the voltage generated in resistor 616) is retained from the setpoint voltage while the switch 614 is on. In response to the conduction mode control signal 613 reaching and/or surpassing the turn-off value, the switch 614 is commanded into its non-conducting state, and as indicated in the control system 500, the subtraction voltage is disabled so that all or substantially all of the setpoint voltage is provided to the non-inverting input of the comparator 607.

Figure 7:
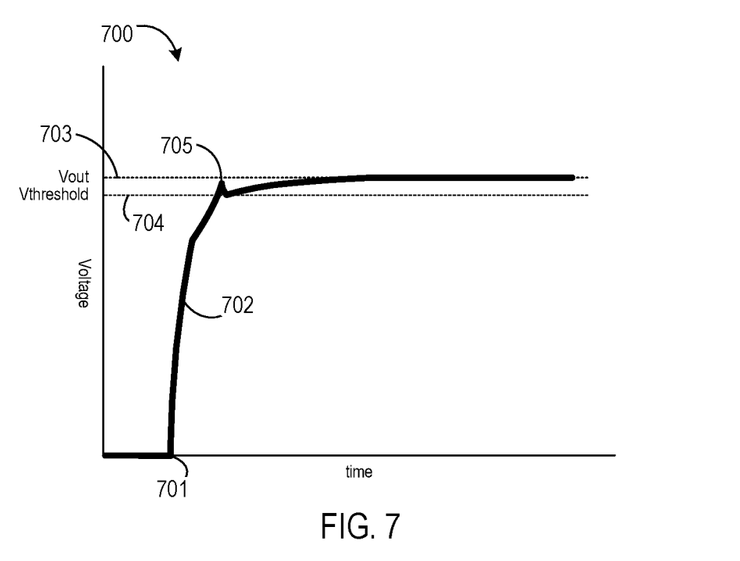
FIG. 7 illustrates a plot of output voltage based on implementation of the control system of FIG. 3 or 5 according to an example.

FIG. 7 illustrates a plot 700 of output voltage based on implementation of the control system of FIG. 3 or 5 according to an example. As described herein, at the beginning 701 of control of the power converter 100 by the controller 104 using the first control mode 105, the output voltage 702 begins rising from zero volts toward the output voltage target 703. In response to the output voltage 702 reaching the voltage threshold 704 as described above, the controller 104 changes to the second control mode 106. However, as a consequence, the output voltage 702 first exceeds the voltage threshold 704. After switching to the second control mode 106, the controller 104 causes the output voltage 702 to drive back toward the first reference voltage that was set at the beginning of the control. The maximum value of the overshoot 705 that occurs as the output voltage 702 exceeds the voltage threshold 704, however, does not exceed the output voltage 703 desired for steady-state runtime operation of the converter 100. By subsequently adjusting the reference voltage as explained herein from the first reference voltage value to a higher, second reference voltage value, the output voltage 702 can be controlled to approach the target output voltage 703 without the overshoot 705 having exceeded a maximum output voltage characteristic defined by desired operation parameters of the converter 100. Accordingly, while voltage overshoot is not prevented through the use of the embodiments described herein, such voltage overshoot happens at a lower level than that which would exceed the maximum output voltage characteristic(s).

Figure 8:
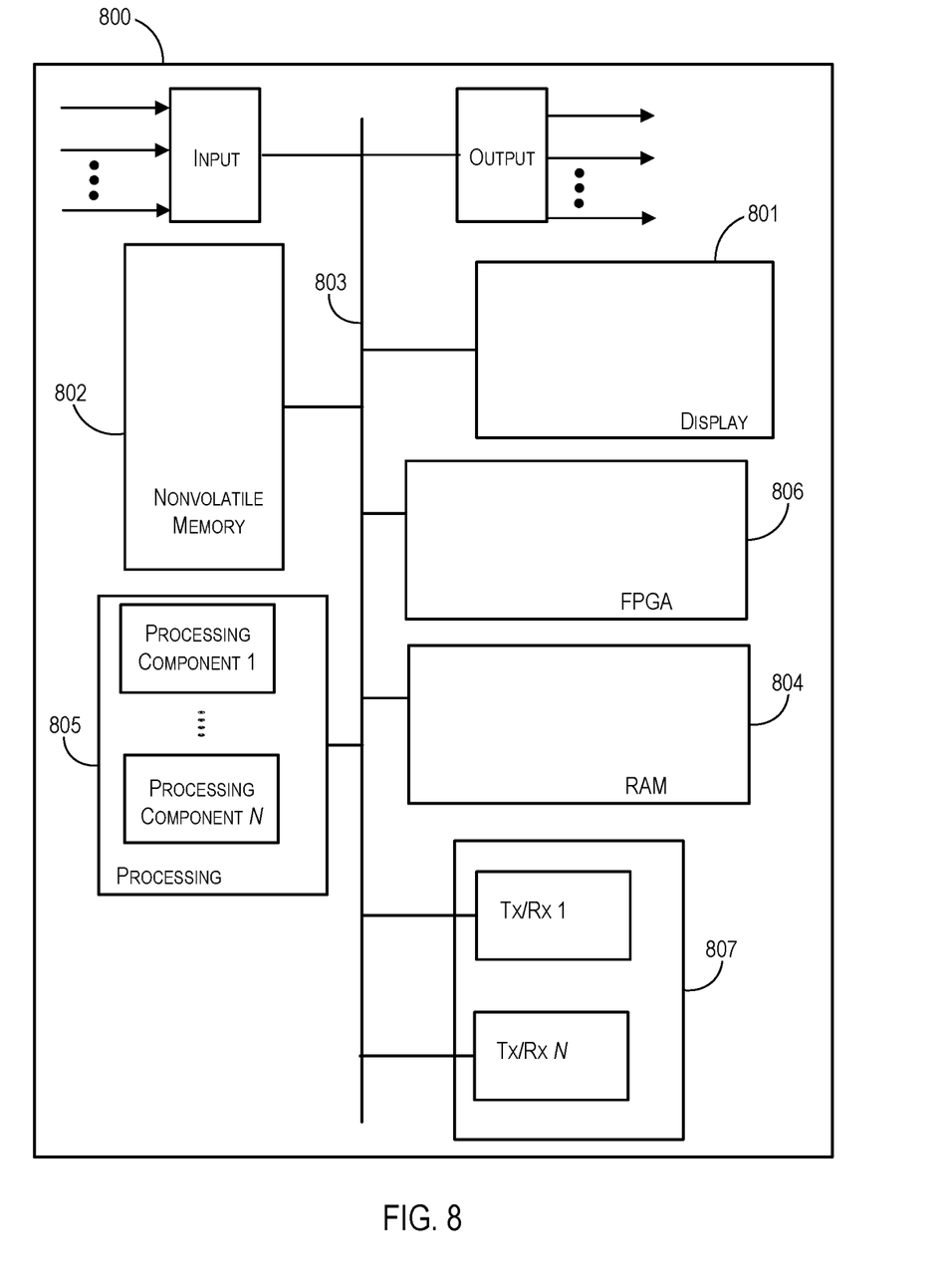
FIG. 8 illustrates an exemplary computing system that may be used to implement aspects of the disclosure.

Referring to FIG. 8, shown is an exemplary computing system 800 that may be used to implement aspects realized in the digital domain. For example, the components depicted in FIG. 8 may be used to realize aspects of the controller depicted in FIG. 1 and aspects of the control systems 300, 500 depicted in FIGS. 3, 5. It is contemplated that the components in FIG. 8 may be integrated with an LLC converter and/or remotely connected to an LLC converter. In other words, the components depicted in FIG. 8 (or a portion thereof) may be duplicated in a distributed manner. It should be recognized that many of the depicted components may be omitted depending upon the implementation and the desired functionality.

As shown, in this embodiment a display portion 801 and nonvolatile memory 802 are coupled to a bus 803 that is also coupled to random access memory ("RAM") 804, a processing portion (which includes N processing components) 805, a field programmable gate array (FPGA) 806, and a transceiver component 807 that includes N transceivers. Although the components depicted in FIG. 8 represent physical components, FIG. 8 is not intended to be a detailed hardware diagram; thus, many of the components depicted in FIG. 8 may be realized by common constructs or distributed among additional physical components. Moreover, it is contemplated that other existing and yet-to-be developed physical components and architectures may be utilized to implement the functional components described with reference to FIG. 8.

The display 801 generally operates to provide information for an operator of the LLC converter, and in several implementations, the display 801 is realized by a touchscreen display. The display 801 be used to enable a user to input target voltages and thresholds associated with control modes disclosed herein. Many aspects described herein may be implemented without the display 801, or the display 801 may be realized by one or more simple illuminating components such as LEDs.

In general, the nonvolatile memory 802 is non-transitory memory that functions to store (e.g., persistently store) data and machine readable (e.g., processor executable) code (including executable code that is associated with effectuating the methods described herein). In some embodiments for example, the nonvolatile memory 802 includes boot-loader code, operating system code, file system code, and non-transitory processor-executable code to facilitate the execution of the methods described herein (e.g., aspects of the open loop mode of control).

In many implementations, the nonvolatile memory 802 is realized by flash memory (e.g., NAND or ONENAND memory), but it is contemplated that other memory types may also be utilized. Although it may be possible to execute the code from the nonvolatile memory 802, the executable code in the nonvolatile memory is typically loaded into RAM 804 and executed by one or more of the N processing components in the processing portion 805.

In operation, the N processing components in connection with RAM 804 may generally operate to execute the instructions stored in nonvolatile memory 802 to realize the functionality of one or more aspects of the control methodologies disclosed herein. For example, non-transitory processor-executable instructions used to effectuate the methods described herein may be persistently stored in nonvolatile memory 802 and executed by the N processing components in connection with RAM 804. As one of ordinary skill in the art will appreciate, the processing portion 805 may include a video processor, digital signal processor (DSP), graphics processing unit (GPU), and other processing components.

In addition, or in the alternative, the FPGA 806 may be configured to effectuate one or more aspects of the methodologies described herein. For example, non-transitory FPGA-configuration-instructions may be persistently stored in nonvolatile memory 802 and accessed by the FPGA 806 (e.g., during boot up) to configure the FPGA 806 to effectuate one or more functions disclosed herein. It is certainly contemplated that the FPGA 806 may be omitted completely.

The input component may operate to receive signals (e.g., from a voltage sensor) that are indicative of operational parameters of the LLC converter. The output component generally operates to provide one or more analog or digital signals to effectuate an operational aspect disclosed herein. For example, the output component may provide control signals to effectuate one or more aspects disclosed herein.

The depicted transceiver component 807 includes N transceiver chains, which may be used for communicating with external devices via wireless or wireline networks. Each of the N transceiver chains may represent a transceiver associated with a particular communication scheme (e.g., WiFi, Ethernet, Profibus, PMBus, etc.). Control aspects of the LLC converter may be distributed across different network-connected locations, so one or more components depicted in FIG. 8 may be duplicated at the different locations and the transceiver component may enable communication between the different locations.

It should be recognized that technologies other than those depicted in FIG. 8 may be utilized instead of, or in addition to, the technologies depicted in FIG. 8. For example, The various illustrative logical blocks, modules, and circuits described in connection with the embodiments disclosed herein may be implemented or performed with an application specific integrated circuit (ASIC), programmable logic device, discrete gate or transistor logic, discrete hardware components, or any combination thereof designed to perform the functions described herein.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the present disclosure. Additionally, while various embodiments of the present disclosure have been described, it is to be understood that aspects of the present disclosure may include only some of the described embodiments. Accordingly, the invention is not to be seen as limited by the foregoing description but is only limited by the scope of the appended claims.

What is claimed is:

1. A power conversion system comprising:
   a power converter configured to convert an input voltage to an output voltage, the power converter comprising:
      an inductor;
      at least one power switch coupled to the inductor;
      a feedback circuit configured to:
         generate a sensed output voltage based on the output voltage;
         provide a feedback signal based on a relationship of the sensed output voltage with a reference voltage; and
         adjust the reference voltage from a first value to a second value after the sensed output voltage has exceeded the first value; and
      a controller coupled to the at least one power switch and to the feedback circuit and configured to control the at least one power switch to generate the output voltage based on the feedback signal.

2. The power conversion system of claim 1, wherein the controller is further configured to:
   control the at least one power switch based on a first control mode during a first portion of power switch control; and
   control the at least one power switch based on a second control mode during a second portion of the power switch control.

3. The power conversion system of claim 2, wherein the first control mode comprises an open-loop control mode; and
   wherein the second control mode comprises a closed-loop control mode.

4. The power conversion system of claim 3, wherein the controller is further configured to switch from the control of the at least one power switch based on the first control mode to the control of the at least one power switch based on the second control mode in response to indication by the feedback signal that the sensed output voltage has exceeded the reference voltage set to the first value.

5. The power conversion system of claim 4, wherein the feedback circuit is configured to adjust the reference voltage from the first value to the second value after the controller has switched to the control of the at least one power switch based on the second control mode.

6. The power conversion system of claim 5, wherein a maximum value of an overshoot of the output voltage produced in response to the control of the at least one power switch based on the first control mode and based on the reference voltage being set to the first value is less than a steady-state value of the output voltage produced in response to the control of the at least one power switch based on the second control mode and based on the reference voltage being set to the second value.

7. The power conversion system of claim 1, wherein the second value is greater than the first value.

8. The power conversion system of claim 1, wherein the feedback circuit is configured to set a setpoint reference to the first value; and wherein the feedback circuit, in being configured to adjust the reference voltage from the first value to the second value, is configured to enable an additional voltage that, when summed with the setpoint reference, adjusts the reference voltage to the second value.

9. The power conversion system of claim 1, wherein the feedback circuit is further configured to:

set a setpoint reference to the second value; and set the reference voltage to the first value by enabling subtraction of a subtraction voltage from the setpoint reference.

10. The power conversion system of claim 9, wherein the feedback circuit, in being configured to adjust the reference voltage from the first value to the second value, is configured to disable subtraction of the subtraction voltage from the setpoint reference.

11. The power conversion system of claim 10, wherein the feedback circuit, in being configured to enable the subtraction of the subtraction voltage, is configured to control a subtraction switch into a conduction mode to cause current from the setpoint reference to flow through a voltage divider.

12. The power conversion system of claim 11, wherein the voltage divider comprises a first resistor coupled to a second resistor via a common node; and wherein the reference voltage is supplied by the common node.

13. The power conversion system of claim 12, wherein the feedback circuit further comprises an operational amplifier comprising:

a non-inverting input coupled to the common node;

an inverting input coupled to the sensed output voltage; and an output coupled to the controller and configured to provide the feedback signal to the controller.

14. The power conversion system of claim 1, wherein the feedback circuit further comprises a voltage divider comprising a first resistor coupled to a second resistor via a common node; and wherein the voltage divider is configured to generate the sensed output voltage at the common node.

15. A method of controlling output voltage overshoot in a power converter including an inductor, at least one power switch coupled to the inductor, a feedback circuit, and a controller coupled to the feedback circuit, the method comprising:

controlling the power converter to produce an output voltage based on a feedback signal;

generating a sensed output voltage based on the output voltage of the power converter;

providing the feedback signal from the feedback circuit to the controller based on a comparison of the sensed output voltage with a reference voltage; and adjusting the reference voltage from a start-up voltage to a runtime voltage in response to a comparison of the sensed output voltage with a threshold voltage.

16. The method of claim 15, wherein controlling the power converter comprises:

adjusting the output voltage based on a first control mode; and in response to the sensed output voltage exceeding the reference voltage being set to the start-up voltage, adjusting the output voltage based on a second control mode.

17. The method of claim 16, wherein adjusting the output voltage based on the second control mode comprises controlling the power converter to produce a runtime output voltage based on the reference voltage being set to the runtime voltage.

18. The method of claim 17, further comprising holding a maximum value of an overshoot voltage produced prior to adjusting the reference voltage from the start-up voltage to the runtime voltage to a value below the runtime output voltage.

19. The method of claim 15, wherein adjusting the reference voltage to the runtime voltage comprises adding an additional voltage to a setpoint voltage; and wherein the setpoint voltage is equal to the start-up voltage.

20. The method of claim 15, wherein adjusting the reference voltage to the runtime voltage comprises subtracting a subtraction voltage from a setpoint voltage; and wherein the setpoint voltage is equal to the runtime voltage.

* * * * *